Patented June 25, 1935

2,006,057

UNITED STATES PATENT OFFICE 2,006,057

VULCANIZATION OF RUBBER

Alfred J. Northam, Wilmington, Del., assignor to E. I. du Pont de Nemours & Company, Wilmington, Del., a corporation of Delaware No Drawing. Application August 22, 1933, Serial No. 686,249

14 Claims. (Cl. 18—53)

This invention relates to the vulcanization of rubber and more particularly to a method whereby rubber products are obtained which are unusually resistant to that deterioration which rubber normally undergoes when subjected to the action of heat and oxidation.

It is well known that certain substances, such as the secondary aromatic amines, possess the power, when incorporated in rubber, of retarding that deterioration which the rubber normally undergoes due to the action of heat and oxygen. It is further well known that, by various methods of compounding, rubber products of varying degrees of resistance to deterioration may be produced. For example, rubber stocks accelerated with mercapto-benzothiazole are much more resistant to deterioration than those accelerated with diphenyl guanidine. In addition, it is known that the rate of deterioration is roughly proportional to the vulcanization coefficient, i. e. to the amount of combined sulfur. Thus a rubber stock containing 5% combined sulfur, in general, will deteriorate much more rapidly than one containing 2% sulfur.

Recently G. S. Whitby, in Patents 1,681,717, and 1,634,925 has disclosed the use of thiuram polysulfides which are capable of vulcanizing rubber without the free addition of sulfur, utilizing only that sulfur which is chemically combined in the accelerator. Such accelerators produce stocks having a very low "vulcanization coefficient" and it is known that such rubber compounds are usually resistant to that deterioration which is due to the action of heat and oxidation.

An object of this invention is to provide a method of producing rubber compounds which are characterized by unusually long life, serviceability and resistance to that deterioration which is normally caused by the action of heat and oxidation. A further object of this invention is to provide rubber products which have been vulcanized in the presence of a combination of accelerators which render such products unusually resistant to deterioration due to the action of heat and oxygen. Further objects are to provide new compositions of matter and to advance the art. Still further objects will appear hereinafter.

These objects may be accomplished according to my invention which comprises vulcanizing a rubber mix having incorporated therein as accelerators of vulcanization a thiuram-polysulfide together with another sulfur containing accelerator such as a tetra substituted thiuram-monosulfide, a thiuram-disulfide, a mercapto-arylene thiazole, a benzothiazyl-disulfide or a thio-carbanilide. By the term thiuram-polysulfide, as employed hereinafter, I mean to include only thiuram sulfides containing more than 4 sulfur atoms for each molecule of the compound which compounds may be generally represented by the formula:

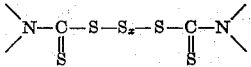

wherein $x$ represents a whole number other than 0 and wherein each N carries 2 organic radicals which may be the same or different or may form part of a cyclic grouping such as piperidine and the like. These thiuram-polysulfides are derived from secondary amines which are treated in a known manner to form the dithiocarbamates which are in turn treated to form the polysulfides in accordance with the methods described in Whitby Patent 1,681,717.

The thiuram-monosulfides and thiuram-disulfides which are to be employed in accordance with my invention are those which have been derived from secondary amines.

The combination of accelerators which are to be employed in accordance with my invention may be added to the rubber mix at the same time or may be mixed before addition to the rubber mix. However, it is not necessary that both accelerators be added to the rubber mix at the same time. They may be added to the rubber mix separately and at different times provided they are both added prior to vulcanization, with the obtention of similar results. My combination of accelerators should ordinarily be employed without the addition of sulfur other than that chemically combined in the accelerators. However, good results may be obtained in the presence of additional sulfur provided that such additional sulfur does not amount to more than 1% based on the weight of the rubber in the mix.

In order to illustrate my invention, the preferred mode of carrying the same into effect and the advantageous results to be obtained thereby, the following "30% dry mineral wire stocks" were prepared.

|  | A | B | C | D | E | F | G | H | I | J |
|---|---|---|---|---|---|---|---|---|---|---|
| Rubber | 100 | 100 | 100 | 100 | 100 | 100 | 100 | 100 | 100 | 100 |
| Zinc oxide | 116 | 116 | 116 | 116 | 116 | 116 | 116 | 116 | 126 | 116 |
| Whiting | 100 | 100 | 100 | 100 | 100 | 100 | 100 | 100 | 100 | 100 |
| Paraffin | 1.6 | 1.6 | 1.6 | 1.6 | 1.6 | 1.6 | 1.6 | 1.6 | 1.6 | 1.6 |
| Di-pentamethylene-thiuram-polysulfide |  | 1.0 | 1.5 |  | 1.0 | 1.5 | 1.0 | .5 | 1 | 1 |
| Tetra-methyl-thiuram-monosulfide | 1.0 |  | 1.4 | 1.0 |  | 1.4 | .5 | 1 | 1 |  |
| Sulfur | 1.0 |  |  | 1.0 |  |  |  |  |  |  |
| Phenyl-b-naphthylamine |  |  |  | 2.0 | 2.0 | 2.0 | 2.0 | 2.0 | 2.0 | 2.0 |
| (2-Benzo-thiazyl)-1-butanone-2 |  |  |  |  |  |  |  |  |  | 1 |

The di-penta-methylene-thiuram-polysulfide employed in the above stocks was the product obtained by reacting 2 moles of the sodium salt of penta-methylene-dithiocarbamic acid, derived from piperidine, with 1 mole of sulfur monochloride in accordance with the methods disclosed by Whitby in Patents 1,634,925 and 1,681,717.

It will be noted that stocks A and D contain sulfur as an added ingredient since they are accelerated only with tetra-methyl-thiuram-monosulfide which is incapable of causing vulcanization in the absence of free sulfur. With the exception of stocks A and D, all stocks were vulcanized for 45 minutes at 20 lbs. steam pressure. Stocks A and D were vulcanized for 45 minutes at 30 lbs. steam pressure, in order that all stocks might have the same degree of vulcanization.

The age resisting properties of these stocks were determined by suspending samples in the Bierer-Davis bomb at 70° C. and 300 lbs. oxygen pressure. The results of this test are given in the following table:

Stock J, in which (2-benzo-thiazol)-1-butanone-2 was used in conjunction with the di-pentamethylene-thiuram-polysulfide, does not show any marked improvement in aging over stock E. This shows that marked improvement in aging is not a natural and inevitable result of the use of a secondary accelerator in conjunction with the di-penta-methylene-thiuram-polysulfide.

Stocks D, E, and F are identical with stocks A, B, and C, except that 2% of a known deterioration inhibitor, phenyl-b-naphthylamine, was added. The table shows that stock F, in which both tetra-methyl-thiuram-mono-sulfide and di-penta-methylene-thiuram-polysulfide were employed, is markedly more resistant to deterioration than either stock D or stock E, in which these two accelerators were used independently.

Stocks G and H give an indication of the wide range within which combinations of these two accelerators may be used to produce rubber products possessing great resistance to deterioration. They do not, however, represent the limiting ratios which will show increased resistance to deterioration.

*Tensile strength in pounds per square inch*

| Stock | Days aged at 70° C. and 300 lbs. oxygen | | | | | |
|---|---|---|---|---|---|---|
|  | 0 | 10 | 15 | 20 | 30 | 40 |
| A | 1475 | 975 | Completely deteriorated. |  |  |  |
| B | 1800 | 975 | 900 | Completely deteriorated. |  |  |
| C | 1475 | 725 | 725 | 675 | Completely deteriorated. |  |
| D | 1800 | 1225 | 1050 | 975 | 925 |  |
| E | 1700 | 1500 | 1300 | 1150 | 925 | Completely deteriorated in 35 days. |
| F | 1650 | 1275 | 1025 | 1000 | 1000 | 1000 |
| G | 1850 | 1675 | 1675 | 1375 | 1175 | 925 |
| H | 1950 | 1650 | 1675 | 1675 | 1400 | 1025 |
| I | 1925 | 1775 | 1800 | 1475 | 1275 | 1000 |
| J | 1725 | 1475 | 1225 | 1175 | 450 | Completely deteriorated in 35 days. |

It will be noted from this table that stock A, vulcanized with tetra-methyl-thiuram-monosulfide, was completely deteriorated after 15 days. Stock B, vulcanized with the di-penta-methylene-thiuram-polysulfide, was completely deteriorated after 20 days. Stock C, in which both tetra-methyl-thiuram-mono-sulfide and the di-penta-methylene-thiuram-polysulfide were used, was not completely deteriorated until 30 days.

Stock I represents the preferred ratio of these two accelerators as indicated by the experiments so far carried out.

While the above tables illustrate the results to be obtained when di-penta-methylene-thiuram-polysulfide and tetra-methyl-thiuram-mono-sulfide are employed together, it will be understood that these results are merely representative of the results which may be obtained by employing accelerators in their respective classes and that other accelerators falling within such classes will produce similar results. For example, the di-pentamethylene-thiuram-polysulfide may be replaced by other thiuram-polysulfides, derived from secondary amines, such as phenyl-ethyl-amine, dicyclo-hexyl-amine, di-butyl-amine and similar polysulfides such as are disclosed in the patents to Whitby 1,681,717 and 1,634,925. Also, the tetramethyl-thiuram-mono-sulfide may be substituted by other thiuram-monosulfide accelerators, derived from secondary amines, such as tetra-ethyl-thiuram - mono - sulfide, tetra - butyl - thiuram-mono-sulfide, diphenyl-diethyl-thiuram-monosulfide, dipenta-methylene-thiuram-mono-sulfide, and the like. The tetra-methyl-thiuram-monosulfide may also be substituted by other sulfur containing accelerators such as the mercapto-arylene-thiazoles represented by mercapto-benzo-thiazole, arylene-thiazyl-disulfides represented by benzothiazyl disulfide, thiocarbanilides and thiuram disulfides with good results which, however, will not be quite so desirable, as a general rule, as the results obtainable by the use of the thiuram-monosulfide.

Any desired combination of such accelerators may be employed provided that at least one of the accelerators is a thiuram polysulfide containing more than 4 sulphur atoms to the molecule and that at least one accelerator of the other type mentioned are employed.

It is also understood that up to 1% of free sulfur may be present in the rubber mix when my combination of accelerators is employed. However, the results obtained in the presence of sulphur will generally be inferior to those obtained in the absence of free sulfur.

While I have illustrated the use of my combination of accelerators in a 30% dry mineral wire insulation stock, it is to be understood that such combination of accelerators may be employed with equal advantage in other types of rubber mixes. The rubber mix employed in illustrating my invention is merely one which represents a type of rubber product in which unusual resistance to deterioration is extremely necessary in practice and illustrates the remarkable resistance to ageing which may be obtained in accordance with my invention.

While I have disclosed specific compounds employed in certain mixes in specific proportions, it will be readily understood that many modifications and variations may be made in the compounds, constituents of the mix, and proportions employed without departing from the spirit of my invention. Accordingly, the scope of my invention is to be limited solely by the appended claims construed as broadly as is permissible in view of the prior art.

I claim:

1. The method of treating rubber which comprises incorporating in a rubber mix, prior to vulcanization, a small amount of a thiuram polysulfide accelerator derived from a secondary amine, together with a small amount of a thiuram monosulfide accelerator derived from a secondary amine.

2. The method of treating rubber which comprises incorporating in a rubber mix, prior to vulcanization, a small amount of di-penta-methylene-thiuram-polysulfide together with a small amount of a thiuram-mono-sulfide accelerator derived from a secondary amine.

3. The method of treating rubber which comprises incorporating in a rubber mix, prior to vulcanization, a small amount of di-penta-methylene-thiuram-polysulfide together with a small amount of tetra-methyl-thiuram-mono-sulfide.

4. Rubber obtainable by vulcanizing a rubber mix containing less than 1% of free sulfur in the presence of a small amount of a thiuram polysulfide accelerator, derived from a secondary amine, together with a small amount of a thiuram monosulfide accelerator, derived from a secondary amine.

5. Rubber obtainable by vulcanizing a rubber mix containing less than 1% of free sulfur in the presence of a small amount of di-penta-methylene-thiuram-polysulfide together with a small amount of a thiuram-mono-sulfide accelerator derived from a secondary amine.

6. Rubber obtainable by vulcanizing a rubber mix containing less than 1% of free sulfur in the presence of a small amount of di-penta-methylene-thiuram-polysulfide together with a small amount of tetra-methyl-thiuram-monosulfide.

7. The method of treating rubber which comprises incorporating in a rubber mix, prior to vulcanization, a small amount of a thiuram polysulfide accelerator derived from a secondary amine, together with a substantially equal amount of a thiuram mono-sulfide accelerator derived from a secondary amine.

8. The method of treating rubber which comprises incorporating in a rubber mix, prior to vulcanization, a small amount of a di-pentamethylene-thiuram-polysulfide together with a substantially equal amount of tetra-methyl-thiuram-mono-sulfide.

9. Rubber obtainable by vulcanizing a rubber mix containing no free sulfur in the presence of a small amount of a thiuram polysulfide accelerator, derived from a secondary amine, together with a substantially equal amount of a thiuram mono-sulfide accelerator, derived from a secondary amine.

10. Rubber obtainable by vulcanizing a rubber mix containing no free sulfur in the presence of a small amount of di-penta-methylene-thiuram-polysulfide together with a substantially equal amount of tetra-methyl-thiuram-mono-sulfide.

11. The method of treating rubber which comprises incorporating in a rubber mix, prior to vulcanization, a small amount of the thiuram polysulfide accelerator derived from di-cyclohexyl-amine, together with a small amount of a thiuram mono-sulfide accelerator derived from a secondary amine.

12. The method of treating rubber which comprises incorporating in a rubber mix, prior to vulcanization, a small amount of a thiuram polysulfide accelerator derived from a secondary amine, together with a small amount of tetra-ethyl-thiuram-mono-sulfide.

13. Rubber obtainable by vulcanizing a rubber mix containing less than 1% of free sulfur in the presence of a small amount of the thiuram polysulfide accelerator derived from di-cyclo-hexyl-amine, together with a small amount of a thiuram mono-sulfide accelerator derived from a secondary amine.

14. Rubber obtainable by vulcanizing a rubber mix containing less than 1% of free sulfur in the presence of a small amount of a thiuram polysulfide accelerator derived from a secondary amine, together with a small amount of tetra-ethyl-thiuram-mono-sulfide.

ALFRED J. NORTHAM.